United States Patent
Xu et al.

(10) Patent No.: US 9,848,393 B2
(45) Date of Patent: Dec. 19, 2017

(54) INTERFERENCE COORDINATION METHOD, INTERFERENCE COORDINATION DEVICE AND MEASUREMENT DEVICE

(71) Applicant: SONY CORPORATION, Tokyo (JP)

(72) Inventors: Xiaodong Xu, Beijing (CN); Yu Sun, Beijing (CN); Rui Gao, Beijing (CN); Baoxue Wu, Beijing (CN)

(73) Assignee: SONY CORPORATION, Tokyo (JP)

(*) Notice: Subject to any disclaimer, the term of this patent is extended or adjusted under 35 U.S.C. 154(b) by 0 days.

(21) Appl. No.: 14/889,089

(22) PCT Filed: Jun. 13, 2014

(86) PCT No.: PCT/CN2014/079830
§ 371 (c)(1),
(2) Date: Nov. 4, 2015

(87) PCT Pub. No.: WO2014/198232
PCT Pub. Date: Dec. 18, 2014

(65) Prior Publication Data
US 2016/0088575 A1    Mar. 24, 2016

(30) Foreign Application Priority Data

Jun. 13, 2013  (CN) .......................... 2013 1 0232592

(51) Int. Cl.
*H04W 52/00*    (2009.01)
*H04W 52/24*    (2009.01)
*H04W 52/14*    (2009.01)
*H04W 52/22*    (2009.01)
(Continued)

(52) U.S. Cl.
CPC ......... *H04W 52/244* (2013.01); *H04W 36/08* (2013.01); *H04W 36/38* (2013.01);
(Continued)

(58) Field of Classification Search
CPC ... H04W 16/08; H04W 36/08; H04W 36/165; H04W 36/38; H04W 52/06;
(Continued)

(56) References Cited

U.S. PATENT DOCUMENTS

2007/0259681 A1* 11/2007 Cheng ................. H04L 27/2608
455/522
2009/0286545 A1* 11/2009 Yavuz ................. H04W 52/146
455/452.1
(Continued)

FOREIGN PATENT DOCUMENTS

| CN | 102484796 A | 5/2012 |
|----|-------------|--------|
| CN | 102656928 A | 9/2012 |
| WO | 2012/165200 A1 | 6/2012 |

OTHER PUBLICATIONS

International Search Report and Written Opinion of the International Searching Authority dated Sep. 23, 2014 in PCT/CN14/79830 Filed Jun. 13, 2014.

*Primary Examiner* — Mohamed Kamara
(74) *Attorney, Agent, or Firm* — Oblon, McClelland, Maier & Neustadt, L.L.P.

(57) ABSTRACT

A system that determines to modify transmission power of a first small cell: determines an effect of modifying transmission power of the first small cell on a user equipment that is served by the first small cell; and controls modifying the transmission power of the first small cell based on the determination to modify the transmission power and the determined effect of modifying the transmission power on the user equipment that is served by the first small cell.

18 Claims, 11 Drawing Sheets

(51) Int. Cl.
*H04W 52/34* (2009.01)
*H04W 36/08* (2009.01)
*H04W 36/38* (2009.01)
*H04W 52/06* (2009.01)
*H04W 36/16* (2009.01)
*H04W 16/08* (2009.01)

(52) U.S. Cl.
CPC ......... *H04W 52/06* (2013.01); *H04W 52/143* (2013.01); *H04W 52/223* (2013.01); *H04W 52/246* (2013.01); *H04W 52/343* (2013.01); *H04W 16/08* (2013.01); *H04W 36/165* (2013.01); *H04W 52/226* (2013.01)

(58) Field of Classification Search
CPC ............. H04W 52/143; H04W 52/223; H04W 52/226; H04W 52/244; H04W 52/246; H04W 52/343; H04W 52/00
See application file for complete search history.

(56) References Cited

U.S. PATENT DOCUMENTS

| | | | |
|---|---|---|---|
| 2010/0273432 A1* | 10/2010 | Meshkati | H04W 16/16 455/67.11 |
| 2011/0218009 A1* | 9/2011 | Morimoto | H04W 72/082 455/513 |
| 2012/0028672 A1* | 2/2012 | Chen | H04W 52/241 455/522 |
| 2012/0142364 A1 | 6/2012 | Duan | |
| 2012/0307808 A1* | 12/2012 | Song | H04W 36/0055 370/336 |
| 2013/0039194 A1* | 2/2013 | Siomina | H04W 52/244 370/252 |
| 2013/0102302 A1 | 4/2013 | Betrencourt et al. | |
| 2013/0107929 A1* | 5/2013 | Ma | H04W 72/08 375/225 |
| 2014/0162662 A1 | 6/2014 | Nagata et al. | |

\* cited by examiner

INTERFERENCE COORDINATION METHOD, INTERFERENCE COORDINATION DEVICE AND MEASUREMENT DEVICE

FIELD OF THE INVENTION

The present invention relates to the field of communication, and particularly to an interference coordination method, an interference coordination device and a measurement device.

BACKGROUND OF THE INVENTION

For an interference problem at the edge of cells, the 3rd Generation Partnership Project (3GPP) introduces the Inter Cell Interference Coordination (ICIC) technology in the R8 version, and introduces the enhanced ICIC (eICIC) in the R10 version, both having multiple results and achieving some effect in interference suppression. Furthermore, a core concept of the interference coordination technology in a Long Term Evolution (LTE) system is to employ the frequency reuse technology to make a distance of interference signal sources between adjacent cells as far as possible, thus suppressing interference between adjacent cells, and an effect of improving transmission quality and raising throughput is achieved. However, although some effect for suppressing the same frequency interference between edge users in the cell is achieved by the interference coordination technology, the frequency of a whole cell is limited by the frequency reuse, which makes the throughput of the whole cell decreased to some extent. Therefore, the interference coordination/avoiding technology is equivalent to a compromise between the throughput of the whole system and throughput of the edge users in the cell, and sacrifices a small part of an entire performance while improving the fairness. Furthermore, in a case that small cells are deployed densely, it is far from enough to solve the interference problem between small cells only depending on the frequency reuse.

SUMMARY OF THE INVENTION

In the following, an overview of the present invention is given simply to provide basic understanding to some aspects of the present invention. It should be understood that this overview is not an exhaustive overview of the present invention. It is not intended to determine a critical part or an important part of the present invention, nor to limit the scope of the present invention. An object of the overview is only to give some concepts in a simplified manner, which serves as a preorder of a more detailed description described later.

In view of this, the present invention provides an interference coordination method, an interference coordination device and a measurement device.

According an aspect of the present invention, there is provided a system that determines to modify transmission power of a first small cell; determines an effect of modifying the transmission power of the first small cell on a user equipment that is served by the first small cell; and controls modifying the transmission power of the first small cell based on the determination to modify the transmission power and the determined effect of modifying the transmission power on the user equipment that is served by the first small cell.

The system according to an embodiment of the present invention described above can lower the interference to the target small cell by, in the case that the interference to the target small cell satisfies the predetermined condition, indicating the target small cell base station to adjust power according to the number of users or indicating the target small cell base station to request the other base station or stations to adjust power according to the number of users.

These and other advantages of the present invention will be more apparent by illustrating in detail a preferred embodiment of the present invention in conjunction with accompanying drawings below.

BRIEF DESCRIPTION OF THE DRAWINGS

The present invention can be better understood by referring to the description hereinafter given in conjunction with the accompanying drawings. In all the accompanying drawings, identical or similar components are denoted with identical or similar reference numerals. The accompanying drawings together with the detailed description below are included in this specification and constitute a part of this specification, and are used to further exemplify a preferred embodiment of the present invention and explain principles and advantages of the present invention. In the drawings.

It should be understood by those skilled in the art that elements in the accompanying drawings are shown only for the purpose of simplicity and clarity, and are not drawn to scale. For example, the sizes of certain elements in the accompanying drawings may be enlarged relative to the other elements, to improve an understanding of the embodiment of the present invention.

DETAILED DESCRIPTION OF THE INVENTION

An exemplary embodiment of the present invention will be described hereinafter in conjunction with the accompanying drawings. For the purpose of conciseness and clarity, not all features of an embodiment are described in this specification. However, it should be understood that multiple decisions specific to the embodiment have to be made in a process of developing any such embodiment to realize a particular object of a developer, for example, conforming to those constraints related to a system and a business, and these constraints may change as the embodiments differs. Furthermore, it should also be understood that although the development work may be very complicated and time-consuming, for those skilled in the art benefiting from the present disclosure, such development work is only a routine task.

Here, it should also be noted that in order to avoid obscuring the present invention due to unnecessary details, only a device structure and/or processing steps closely related to the solution according to the present invention are illustrated in the accompanying drawing, and other details having little relationship to the present invention are omitted.

An embodiment of the present invention provides an interference coordination method in a wireless communication system. The interference coordination includes: in a case that interference to a target small cell satisfies a predetermined condition, the target small cell base station adjusting power at least based upon the number of users in a coverage area thereof, and/or requesting other small cell base station or stations producing interference thereto to adjust power at least based upon the number of users in a coverage area of the other small cell base station or stations producing the interference described above to lower the interference to the target small cell.

Figure 1A:
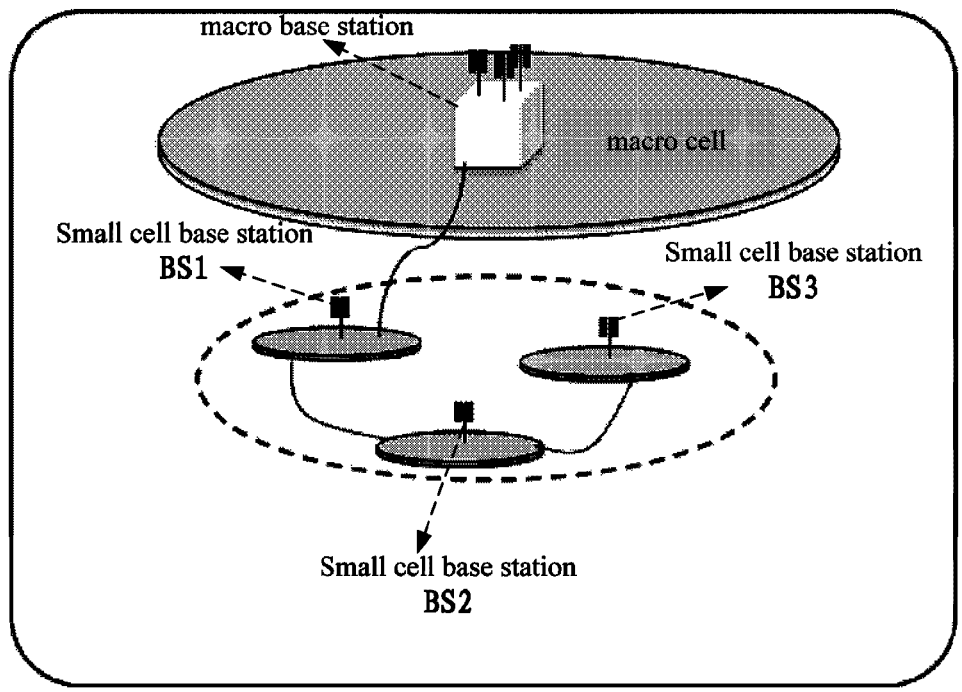
FIG. 1A to FIG. 1C show schematic diagrams of deployment scenarios 2a, 2b and 3 of small cell in Long Term Evolution-Advanced (LTE-A)
Figure 1B:
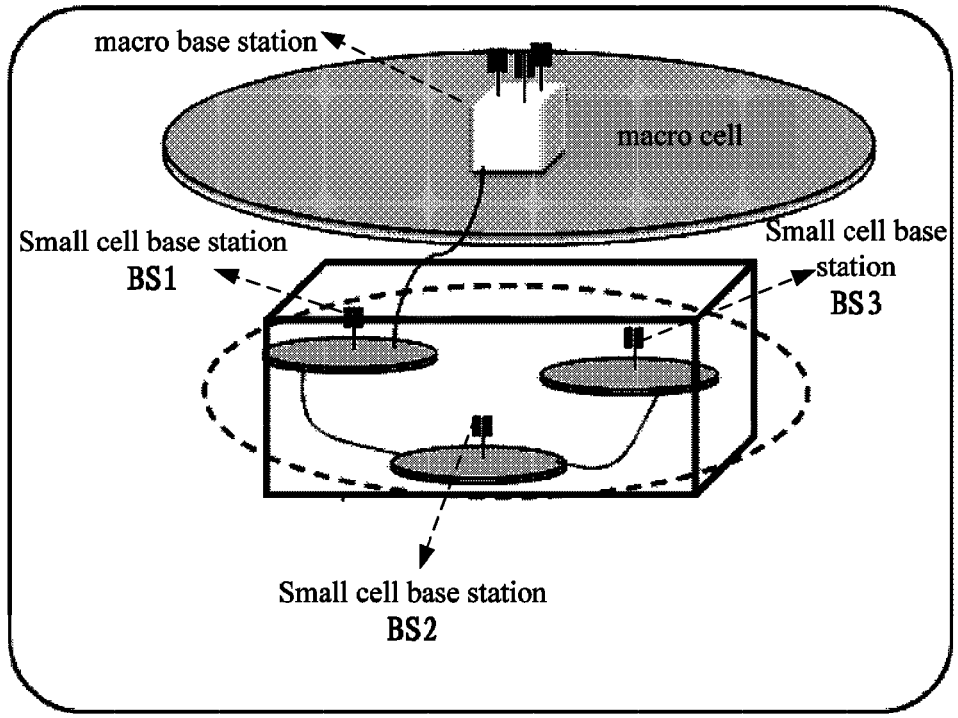
Figure 1C:
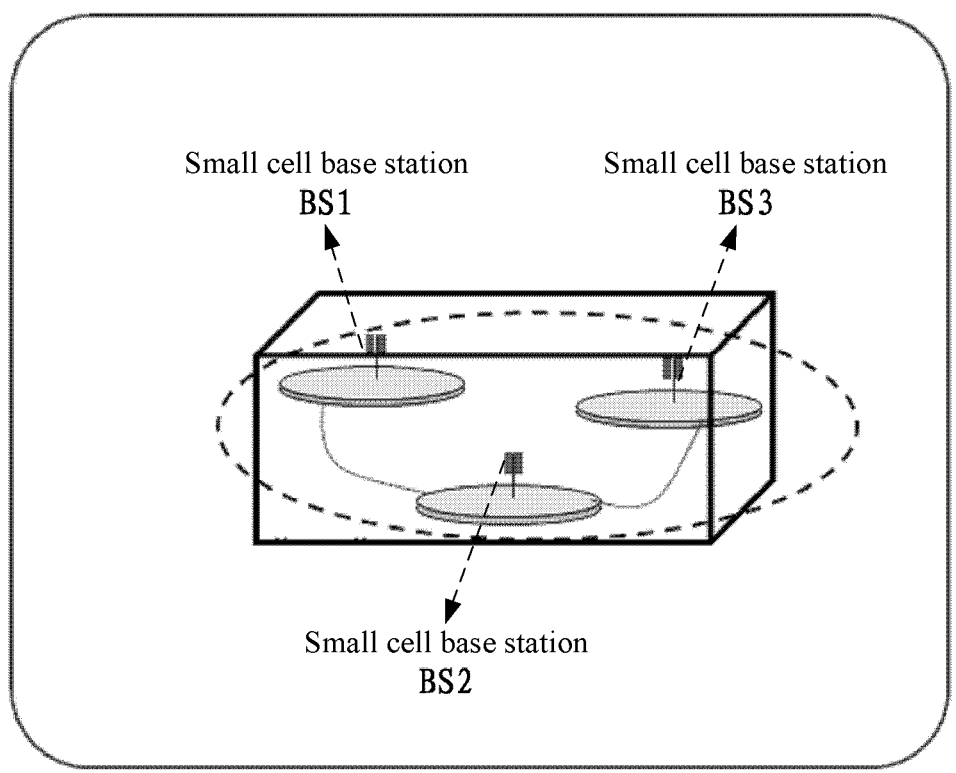

In practical application, the interference coordination method described above according to the embodiment of the present invention can be applied in the small cell deployment scenarios 2a, 2b or 3 in a LTE-A R12 heterogeneous network. FIG. 1A to 1C show schematic diagrams of the small cell deployment scenarios 2a, 2b and 3 in LTE-A.

Specifically, in the small cell deployment scenario 2a in LTE-A, a small cell is in a coverage area of a macro cell, a frequency of the macro cell is different from that of the small cell, and the small cell is outdoor. As shown in FIG. 1A, BS1, BS2 and BS3 represent three small cell base stations, a dotted line circle outside of the BS1, BS2 and BS3 represents that all the three small cell base stations are in the coverage area of the macro cell (i.e. in a coverage area of a macro base station).

In the small cell deployment scenario 2b in LTE-A, a small cell is in a coverage area of a macro cell, a frequency of the macro cell is different from that of the small cell, and the small cell is indoor. It differs from the small cell deployment scenario 2a in LET-A shown in FIG. 1A in that a cuboid outside of the BS1, BS2 and BS3 shown in FIG. 1B represents the three small cell base stations are indoor.

Furthermore, in the small cell deployment scenario 3 in LTE-A, there is no macro cell in the wireless communication system, and the small cell is indoor. As shown in FIG. 1C, three small cell base stations BS1, BS2 and BS3 are indoors, and there is no macro cell (or macro base station).

It should be noted that in the small cell deployment scenarios 2a and 2b in LET-A, interference between small cells becomes the main interference since the frequency of the small cell is different from that of the macro cell; and in the small cell deployment scenario 3 in LET-A, the small cell is also only subjected to interference from circumambient small cells since there is no macro cell.

In an implementation manner of the interference coordination method according to the embodiment of the present invention, the interference coordination method described above can be implemented based upon baseband cloud (equivalent to a centralized processing). In the implementation manner, the baseband cloud can receive the interference to a first small cell (e.g. a target small cell) and information on the number of users, and in a case that the interference to the first small cell satisfies a predetermined condition, determine corresponding power adjustment at least based upon the number of users in a coverage area thereof, or determine power adjustment to a second small cell base station producing interference to the first small cell based upon the number of users in a coverage area of the second small cell base station, and then send an indicator of power adjustment to a first base station or a second base station.

An exemplary processing of the interference coordination method in the wireless communication system described above is described below in conjunction with FIG. 2.

Figure 2:
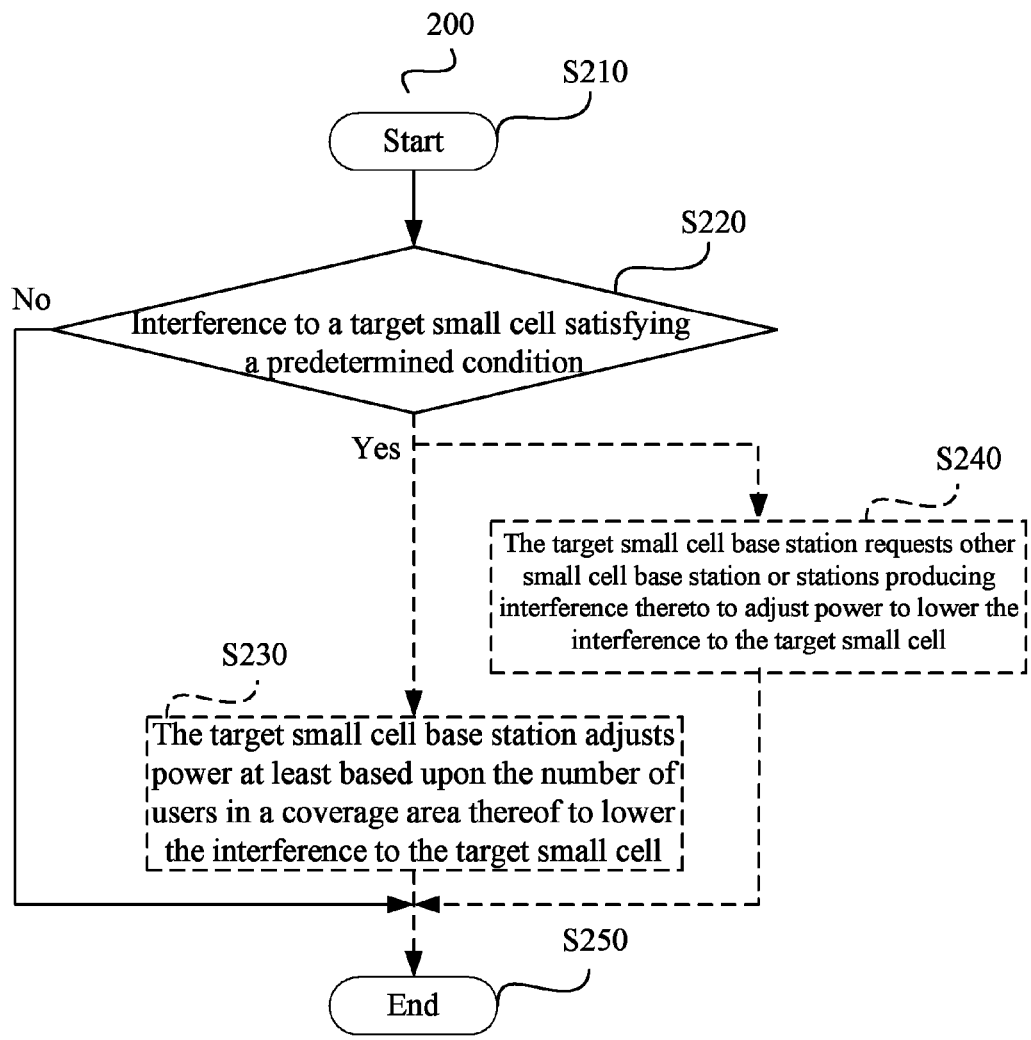
FIG. 2 is a flow chart for schematically showing one exemplary processing of an interference coordination method in a wireless communication system according to an embodiment of the present invention.

As shown in FIG. 2, a processing flow 200 of the interference coordination method in the wireless communication system according to the embodiment of the present invention starts from a step S210, and then performs a step S220.

In the step S220, it is determined whether interference to a target small cell satisfies a predetermined condition. In the case that the interference to the target small cell satisfies the predetermined condition described above, a step S230 and/or a step S240 are performed, and in the case that the interference to the target small cell dissatisfies the predetermined condition described above, a step S250 is performed.

Specifically, the target small cell base station described above may be for example any one of multiple small cell base stations in a coverage area of the wireless communication system described above.

In an implementation manner of the interference coordination method according to the embodiment of the present invention, the interference to the target small cell may be estimated by using transmission power of respective small cell base stations in the wireless communication system. In one example, the transmission power of the respective small cell base stations described above in the wireless communication system may be included in an indication signaling exchanged between respective small cell base stations described above. For those skilled in the art, a method for estimating the interference of the respective small cell base stations described above to the target small cell using an existing algorithm, according to the transmission power of the respective small cell base stations described above and a distance between the respective small cell base stations described above and the target small cell base station can be acquired by referring to common knowledge and/or the disclosed materials in the art, which is not described in detail here any more.

Furthermore, in another implementation manner of the interference coordination method according the embodiment of the present invention, the interference to the target small cell may also be obtained according to interference to users in a coverage area of the target small cell base station. For example, the interference to the target small cell may correspond to interference to all users in the coverage area of the target small cell base station, that is, the interference to the target small cell may be equivalent to a sum of the interference to all the users in the coverage area of the target small cell base station. Specifically, the interference to users in the coverage area of the target small cell base station can be obtained for example by a measurement device arranged at the user, or can also be obtained by the target small cell base station itself, for example, in a case that a configuration ratio between uplink and downlink of a subframe of respective small cell base stations is different in a Time Division Duplex (TDD) system, and the like.

In an implementation manner of the interference coordination method according to the embodiment of the present invention, the predetermined condition described above may include only a condition as follows: the interference to the target small cell is above a first predetermined threshold (referred to as "a first condition" hereinafter). In this case, when the interference to the target small cell satisfies the first condition, a step S230 or a step S240 may be performed; if the interference to the target small cell dissatisfies the first condition, a step S250 may be performed.

In another implementation manner of the interference coordination method according to the embodiment of the present invention, the predetermined condition described above may also include only a condition as follows: the target small cell is any one of at least one small cell subjected to the most serious interference in the wireless communication system or in a predetermined cluster of small cells (referred to as "a second condition" hereinafter). In this case, when the interference to the target small cell is so serious that the target small cell becomes one of the at least one small cell subjected to the most serious interference in the predetermined cluster of small cells described above, a step S230 or a step S240 may then be performed; if the target small cell is not one of the at least one small cell subjected to the most serious interference in the predetermined cluster of small cells described above, a step S250 may then be performed.

All base stations (such as multiple small cell base stations) in the wireless communication system or in the predetermined cluster of small cells are ranked according to a degree of interference thereto, for example, all base stations are ranked according the degree of subjected interference, for example from largest to smallest, with "at least one small cell subjected to the most serious interference" referring to at least one small cell ranked in the foremost. Specifically, the number corresponding to the "at least one" in the "at least one small cell" may be preset, for example, may be one, two or more.

For example, provided that the number of all small cells in the wireless communication system or in the predetermined cluster of small cells is 5, and the 5 small cells are a first small cell, a second small cell, a third small cell, a fourth small cell and a fifth small cell respectively. It is assumed that a result of ranking the 5 small cells according to the degree of subjected interference from largest to smallest is:

the second small cell (subjected interference)>the fourth small cell (subjected interference)>the fifth small cell (subjected interference)>the first small cell (subjected interference)>the third small cell (subjected interference).

Provided that the number corresponding to the "at least one" is preset to 3, the at least one small cell subjected to the most serious interference (i.e. 3 small cells subjected to the most serious interference) in the wireless communication system or in the predetermined cluster of small cells described above are the second small cell, the fourth small cell and the fifth small cell.

In another implementation manner of the interference coordination method according to the embodiment of the present invention, the predetermined condition described above may include the first condition and the second condition described above simultaneously. In this case, if the interference to target small cell satisfies the first condition and the second condition described above simultaneously (i.e. the interference to the target small cell is above the first predetermined threshold, and the target small cell base station is one of the at least one small cell subjected to the most serious interference in the wireless communication system or in the predetermined cluster of small cells), a step S230 or a step S240 may be performed; or if any one of the first condition and the second condition described above is dissatisfied, a step S250 may be performed.

In practical processing, the first condition and/or the second condition described above may be chosen as the predetermined condition described above according to actual need (can also be chosen according to an empiric value or via an experimental method). Hence, according to different communication requirements (or other requirements), the small cell base stations required to be power adjusted (i.e. the base station corresponding to the small cell satisfying the predetermined condition described above) can be determined in the wireless communication system or in the predetermined cluster of small cells, and each of the determined small cell base stations required to be power adjusted is taken as the target small cell base station described above to perform corresponding processing.

As shown in FIG. 2, in the step S230, the target small cell base station adjusts power at least based upon the number of users in a coverage area thereof to lower interference to the target small cell. The step S250 is then performed. For the purpose of convenience, the processing procedure of "the target small cell base station adjusting power at least based upon the number of users in a coverage area thereof" preformed in the step S230 is referred to as "a first kind of preliminary adjustment".

Furthermore, as shown in FIG. 2, in the step S240, the target small cell base station requests other small cell base station or stations (also be referred to as "the requested small cell base station" below) producing the interference thereto to adjust power at least based upon the number of users in a coverage area of the other small cell base station or stations (i.e. "the requested small cell base station") producing the interference described above, to lower the interference to the target small cell. The step S250 is then performed. For the purpose of convenience, a processing procedure of "the target small cell base station requesting other small cell base station or stations producing the interference thereto to adjust power at least based upon the number of users in a coverage area of the other small cell base station or stations producing the interference described above" preformed in the step S240 is referred to as "a second kind of preliminary adjustment".

In a particular implementation manner (a first particular implementation manner) of the interference coordination method according to the embodiment of the present invention, the first kind of preliminary adjustment in step S230 (and/or the second kind of preliminary adjustment in step S240) may include for example lowering transmission power of the small cell base stations (for example, the target small cell base station in step S230 and/or the requested small cell base station in step S240) to narrow the coverage area of the small cell base station, and switching users who leave the coverage area of the small cell base station while the transmission power of the small cell base station is lowered to other cell or cells.

Specifically, in one example of the first particular implementation manner described above, the "other cell or cells" in the "switching users who leave the coverage area of the small cell base station while the transmission power of the small cell base station is lowered to other cell or cells" may include for example adjacent small cells of the small cell base station and a macro cell covering the small cell, and the adjacent small cells of the small cell base station may have a higher priority level than that of the macro cell. It should be noted that "the small cell base station" and "the small cell" described here correspond to the same small cell. Hence, in the step S230 (and/or the step S240), in a case that the adjacent small cells of the small cell base station and the macro cell all have enough receptivity, edge users (and/or central users) in the coverage area of the small cell base station are preferably switched to the adjacent small cells thereof.

In an implementation manner of the interference coordination method according to the embodiment of the present invention, for each of all small cell base stations included in the wireless communication system (for example, the target small cell base station or any one of small cell base stations except for the target small cell base station), a coverage area of the small cell base station may include a central region and an edge region. Wherein, the central region of the small cell base station is a region where central users in the coverage area of the small cell base station (also referred to as "central users of the small cell base station" below) are located, and the edge region of the small cell base station is a region where edge users in the coverage area of the small cell base station (also referred to as "edge users of the small cell base station" below) are located. Specifically, the central users of the small cell base station are users with a signal quality satisfying a predetermined quality condition, and the edge users of the small cell base station are users with a signal quality dissatisfying the predetermined quality condition. It should be illustrated that small cell base stations except for the target small cell base station may include the requested small cell base station.

In one example, the predetermined quality condition described above may be a condition set according to a value of Reference Signal Reception power (RSRP)/Reference Signal Received Quality (RSRQ). For example, the predetermined quality condition described above may be that the value of RSRP/RSRQ is above or equal to a second predetermined threshold. Hence, in this example, the central users of the small cell base station described above may be users with a value of RSRP/RSRQ being above or equal to the second predetermined threshold described above, and the edge users of the small cell base station described above may be users with a value of RSRP/RSRQ below the second predetermined threshold. Specifically, for those skilled in the art, the value of RSRP/RSRQ of a user may be obtained from common knowledge and/or in conjunction with the disclosed materials, which is not described in detail here further.

It should be illustrated that the predetermined quality condition described above is not limited to the condition set according to the value of RSRP/RSRQ described in the above example, and for example can also be a condition set according to other standards capable of evaluating signal quality such as a Received Signal Strength Indicator (RSSI), a Signal-to-Interference plus Noise Ratio (SINR), which is not described here further.

Hence, after dividing the users in the coverage area of the small cell base station into the central users and the edge users, the small cell base station (such as the target small cell base station or "the requested small cell base station" described above) can adjust power at least based upon the number of the central users and/or the edge users thereof.

In another example of the first particular implementation manner described above, in a case that the coverage area of the small cell base station (such as the target small cell base station or "the requested small cell base station" described above) includes the central region and the edge region (i.e., users of the small cell base station include the central users and the edge users), the processing of the "lowering transmission power of the small cell base station (such as the target small cell base station in the step S230 and/or the requested small cell base station in step S240)" can be implemented by for example the processing as follows: lowering transmission power of the small cell base station (such as the target small cell base station in the step S230 and/or the requested small cell base station in the step S240) at a first predetermined step size, and switching edge users who leave the coverage area of the small cell base station while the transmission power of the small cell base station is lowered to other cell or cells (such as the adjacent small cells of the small cell base station or the macro cell covering the small cell) until the edge users who leave the coverage area of the small cell base station cannot be switched to other cell or cells described above.

Furthermore, in one example of the first particular implementation manner described above, in a case that users who leave the coverage area of the small cell base station while the transmission power of the small cell base station (such as the target small cell base station in the step S230 and/or the requested small cell base station in the step S240) is lowered can be switched to other cell or cells, the transmission power of the small cell base station can be at least lowered to be only capable of covering the central region thereof.

Furthermore, in another example of the first particular implementation manner described above, in the case that the coverage area of the small cell base station (such as the target small cell base station in the step S230 and/or the requested small cell base station in the step S240) includes the central region and the edge region described above, the transmission power of the small cell base station can be adjusted to the lowest transmission power thereof. Specifically, the lowest transmission power of the small cell base station is a transmission power at which the small cell base station cannot transmit a downlink signal to a user thereof, but can communicate with another base station.

Figure 3:
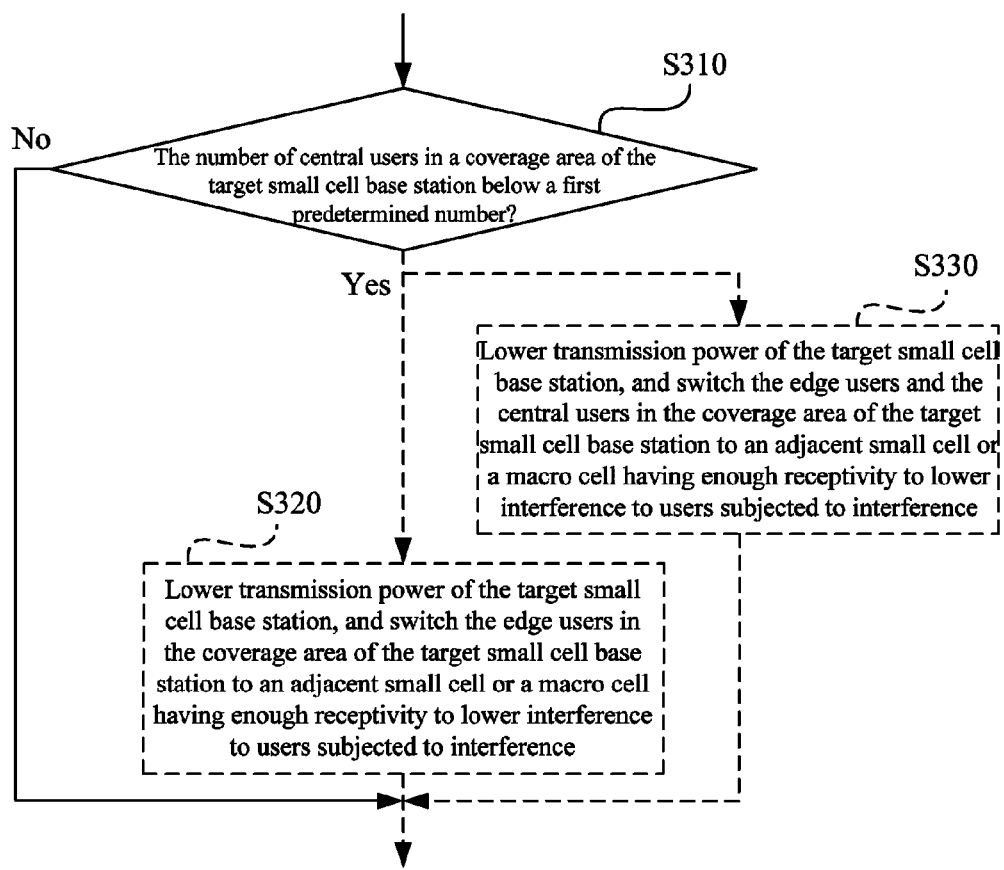
FIG. 3 is a flow chart for schematically showing one possible exemplary processing of a step S230 as shown in FIG. 2.

In a particular implementation manner (a second particular implementation manner) of the interference coordination method according to the embodiment of the present invention, in a case that the coverage area of the target small cell base station includes the central region and the edge region described above, the processing of the step S230 can be realized for example by steps S310 to S330 shown in FIG. 3.

As shown in FIG. 3, it is determined whether the number of central users in a coverage area of the target small cell base station (as an example of the small cell base station mentioned in the first particular implementation manner described above) is below a first predetermined number in the step S310; if the number of the central users in the coverage area of the target small cell base station is below the first predetermined number, a step S320 or a step S330 is then performed; otherwise, a subsequent processing (for example the step S250) after step S230 is performed.

In the step S320, transmission power of the target small cell base station can be lowered in a corresponding predetermined manner, and the edge users in the coverage area of the target small cell base station can be switched to an adjacent small cell or a macro cell having enough receptivity to lower interference to users subjected to interference in an original coverage area of the target small cell base station (i.e. a coverage area before the transmission power is lowered). The subsequent processing (for example the step S250) after the steps S310 to S330 is then performed.

In the step S330, transmission power of the target small cell base station can be lowered in a corresponding predetermined manner, and the edge users and the central users in the coverage area of the target small cell base station can be switched to an adjacent small cell or a macro cell having enough receptivity to lower interference to users subjected to interference in the coverage area of the target small cell base station before the transmission power is lowered. The subsequent processing (for example the step S250) after the steps S310 to S330 is then performed. It should be illustrated that the predetermined manner in the step S330 can be identical to or different from that in the step S320.

In one example (a first example), in the step S320 and the step S330, it can be determined whether to switch the edge users (and/or the central users) of the target small cell base station to an adjacent small cell thereof or a macro cell, according to the priority level of the adjacent small cell of the target small cell base station and the priority level of the macro cell.

In another example (a second example), in a procedure of performing power adjustment by the target small cell base station in the step S330, when the central users in the coverage area of the target small cell base station can be switched to the adjacent small cell thereof (also referred to as "receiving small cell" below), the transmission power of the target small cell base station can be adjusted to the lowest transmission power thereof (as an example of "lowering the transmission power of the target small cell base station in a corresponding predetermined manner"), and the central users and the edge users in the original coverage area of the target small cell base station (i.e., the coverage area before the transmission power is lowered) are all switched to the receiving small cell. It should be illustrated that the receiving small cell described above may include only one small cell, or may include multiple small cells. In practical processing, the processing described in the second example can be performed for example in a case that there is no macro cell in the wireless communication system (for example, when the target small cell base station is located in the small cell deployment scenario 3 in LET-A).

Furthermore, in still another example (a third example), in a procedure of performing power adjustment by the target small cell base station in the step S330, if the central users in the coverage area of the target small cell base station cannot be switched to the adjacent small cells thereof, and cannot be switched to the macro cell either (for example, there is no macro cell in the wireless system), but the edge users thereof can be switched to the adjacent small cells or the macro cell, the transmission power of the target small cell base station can be lowered, so that the lowered transmission power of the target small cell base station can cover only the central region thereof, and cannot cover the edge region thereof (as an example of "lowering the transmission power of the target small cell base station in a corresponding predetermined manner"), and the edge users in the original coverage area of the target small cell base station (i.e., the coverage area before the transmission power is lowered) are switched to the adjacent small cell having enough receptivity. In practical processing, the processing described in the third example can be performed for example in a case that there is no macro cell in the wireless communication system (for example, when the target small cell base station is located in the small cell deployment scenario 3 in LET-A).

Furthermore, in yet another example (a fourth example), in a procedure of performing power adjustment by the target small cell base station in the step S330, if there is a macro cell in the wireless communication system, and the target small cell base station and the adjacent small cell base stations thereof are in a coverage area of the macro cell base station, the transmission power of the target small cell base station can be adjusted to the lowest transmission power thereof (as an example of "lowering the transmission power of the target small cell base station in a corresponding predetermined manner"), and the central users in the original coverage area of the target small cell base station (i.e., the coverage area before the transmission power is lowered) can be switched to the macro cell described above, and the edge users in the original coverage area of the target small cell base station (i.e., the coverage area before the transmission power is lowered) can be switched to the adjacent small cell having enough receptivity. Specifically, in the fourth example, the target small cell base station may be located for example in the small cell deployment scenario 2a or 2b in LET-A.

Figure 4:
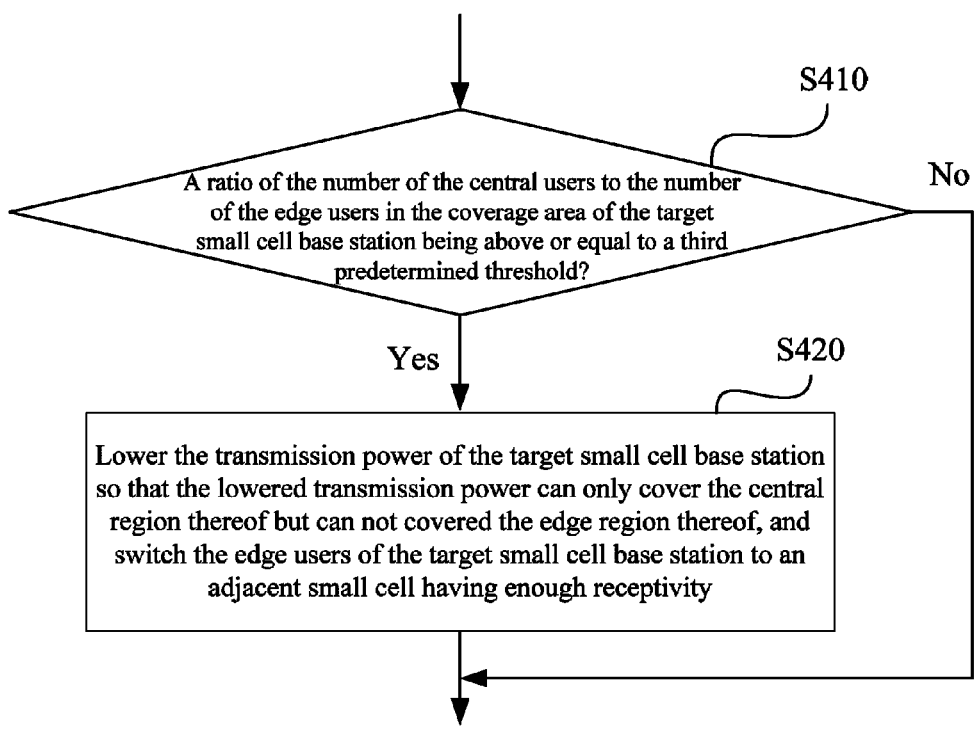
FIG. 4 is a flow chart for schematically showing another possible exemplary processing of a step S230 as shown in FIG. 2.

In another particular implementation manner (a third particular implementation manner) of the interference coordination method according to the embodiment of the present invention, in a case that the coverage area of the target small cell base station includes the central region described above and the edge region described above, the processing in the step S230 can include for example processing of steps S410 to S420 as shown in FIG. 4, and can selectively include processing of the steps S310 to S330 described in the above second implementation manner in conjunction with FIG. 3. In the following, the particular implementation manner is described by taking the case that the step S230 includes the steps S310 to S330 and the steps S410 to S420 as an example, and a case that the step S230 includes only the steps S410 to S420 can refer to the following description, hence the case is not described any more.

It is determined whether the number of central users in the coverage area of the target small cell base station is below a first predetermined number in step S310: if the number of the central users in the coverage area of the target small cell base station is below the first predetermined number, a step S320 or a step S330 is then performed; otherwise, a step S410 is performed. Specifically, processing of step S320, S330 is identical to that in the second particular implementation manner, and the same effect can be achieved, which is not described here further. However, it should be noted that, in the third particular implementation manner, after the S320 or the S330 is performed, a subsequent processing (for example the step S250) after the step S420 is performed.

In one exemplary processing of the step S410 (not shown in FIG. 4), the transmission power of the target small cell base station can be lowered, so that the lowered transmission power thereof can only cover the central region thereof, but cannot cover the edge region thereof, and the edge users in the original coverage area of the target small cell base station (i.e., the coverage area before the transmission power is lowered) are switched to the adjacent small cells having enough receptivity.

Furthermore, in another exemplary processing of the step S410 (as shown in FIG. 4), it is determined whether a ratio of the number of the central users to the number of the edge users in the coverage area of the target small cell base station is above or equal to a third predetermined threshold: if the ratio is above or equal to the third predetermined threshold, a step S420 is then performed; otherwise, a subsequent processing (for example the step S250) after the step S420 is then performed.

In the step S420 (as shown in FIG. 4), the transmission power of the target small cell base station is lowered, so that the lowered transmission power can only cover the central region thereof, but cannot cover the edge region thereof, and the edge users in the original coverage area of the target small cell base station (i.e., the coverage area before the transmission power is lowered) are switched to the adjacent small cells having enough receptivity.

Furthermore, in one implementation manner of the interference coordination method according to the embodiment of the present invention, the step S230 can include the following processing: the target small cell base station can adjust power based upon interference to users in the coverage area thereof.

A processing procedure of "the target small cell base station adjusting power based upon interference to users in the coverage area thereof" performed in step S230 is referred to as "a further adjustment" below. It should be illustrated that in some implementation manners according the embodiment of the present invention, the step S230 can also selectively include the first kind of preliminary adjustment described above besides including the further adjustment described above (for example, the further adjustment described above can be performed after the first kind of preliminary adjustment), which is not described here further.

Figure 5A:
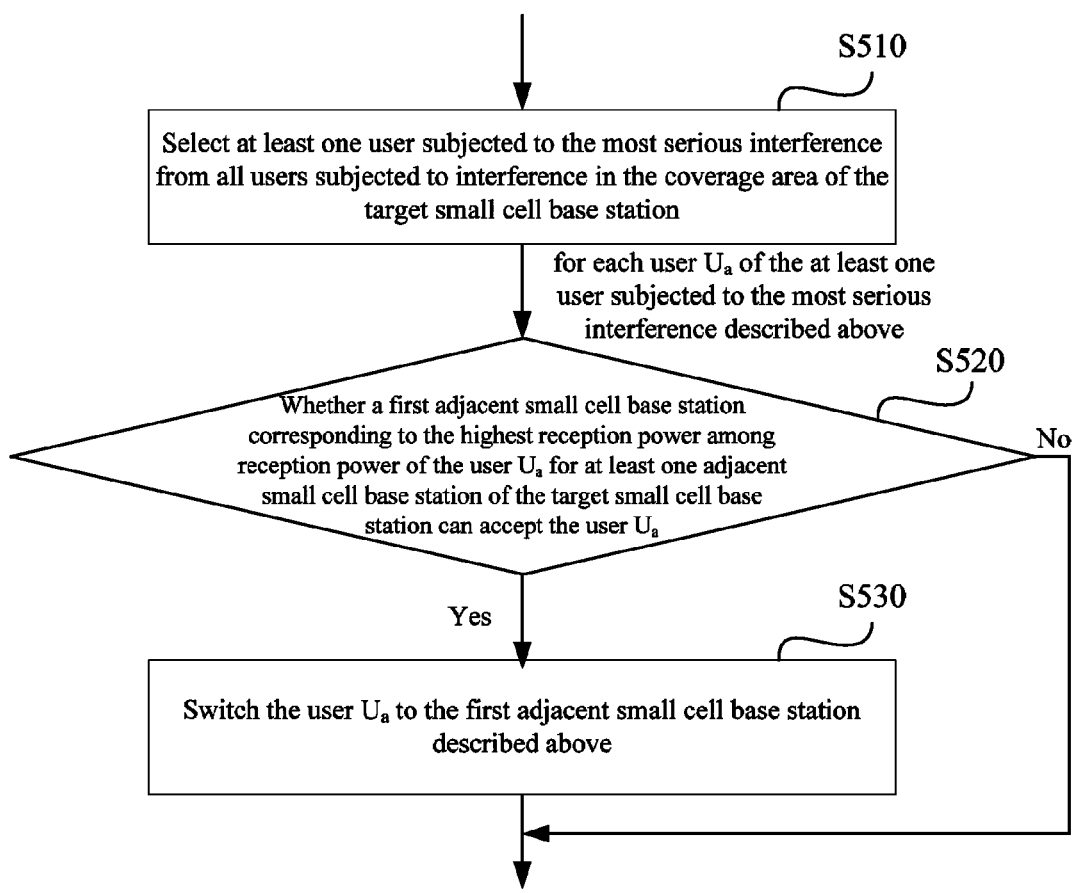
FIG. 5A to 5D are flow charts for schematically showing four possible exemplary processing of a further adjustment.

In one example (a fifth example), the further adjustment described above can be implemented by steps S510 to S530 as shown in FIG. 5A.

As shown in FIG. 5A, in a step S510, at least one user subjected to the most serious interference can be selected from all users subjected to interference in the coverage area of the target small cell base station. A step S520 is then performed.

In the step S520, for each (indicated by $U_a$ below) of the at least one user subjected to the most serious interference selected in the step S510, it is determined whether a first adjacent small cell base station corresponding to the highest reception power among reception power of the user $U_a$ from at least one adjacent small cell base station of the target small cell base station can accept the user (for example, whether the remaining resources is enough to accept this user); if the first adjacent small cell base station can accept the user, a step S530 is then performed; otherwise, a subsequent processing (for example the step S250) after the further adjustment is performed.

In the step S530, the user $U_a$ is switched to the first adjacent small cell base station described above. A subsequent processing (for example, the step S250) after the further adjustment is then performed.

Figure 5B:
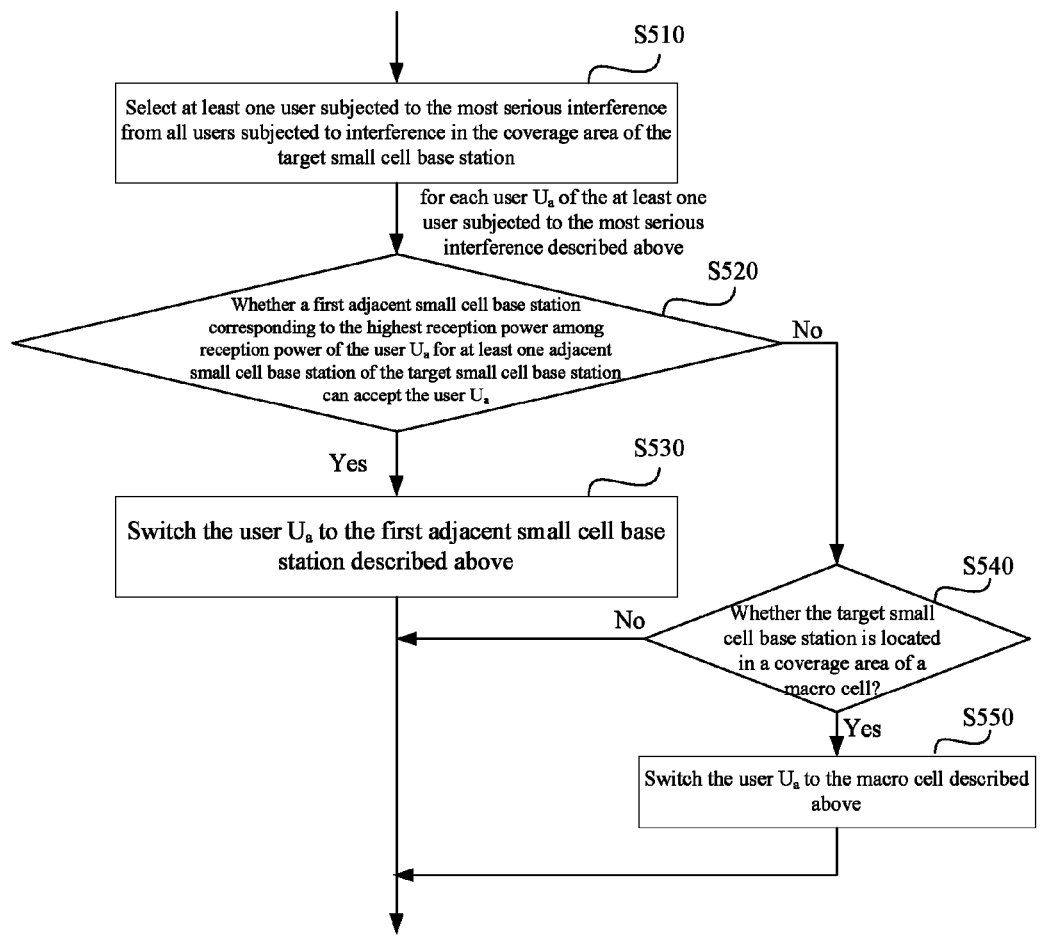

In another example (a sixth example), the further adjustment described above can also include steps S510 to S550 as shown in FIG. 5B.

Specifically, processing of the steps S510, S520 and S530 shown in FIG. 5B may be identical to those of the steps S510, S520 and S530 described above in conjunction with FIG. 5A respectively, and can achieve the same effect, thus the processing of the steps S510, S520 and S530 shown in FIG. 5B are not described in detail here further.

It should be illustrated that in the step S520 shown in FIG. 5B, if it is determined that the first adjacent small cell base station cannot accept this user, a step S540 is then performed.

In the step S540, it is determined whether the target small cell base station is located in a coverage area of a macro cell: if the target small cell base station is located in the coverage area of the macro cell, a step S550 is then performed; otherwise, a subsequent processing (for example the step S250) after the further adjustment is performed.

In the step S550, the user $U_a$ is switched to the macro cell described above. Specifically, the macro cell can accept the user. Then, a subsequent processing (for example the step S250) after the further adjustment is performed.

Specifically, in the sixth example, the target small cell base station can be located for example in the small cell deployment scenario 2a or 2b in LTE-A.

Figure 5C:
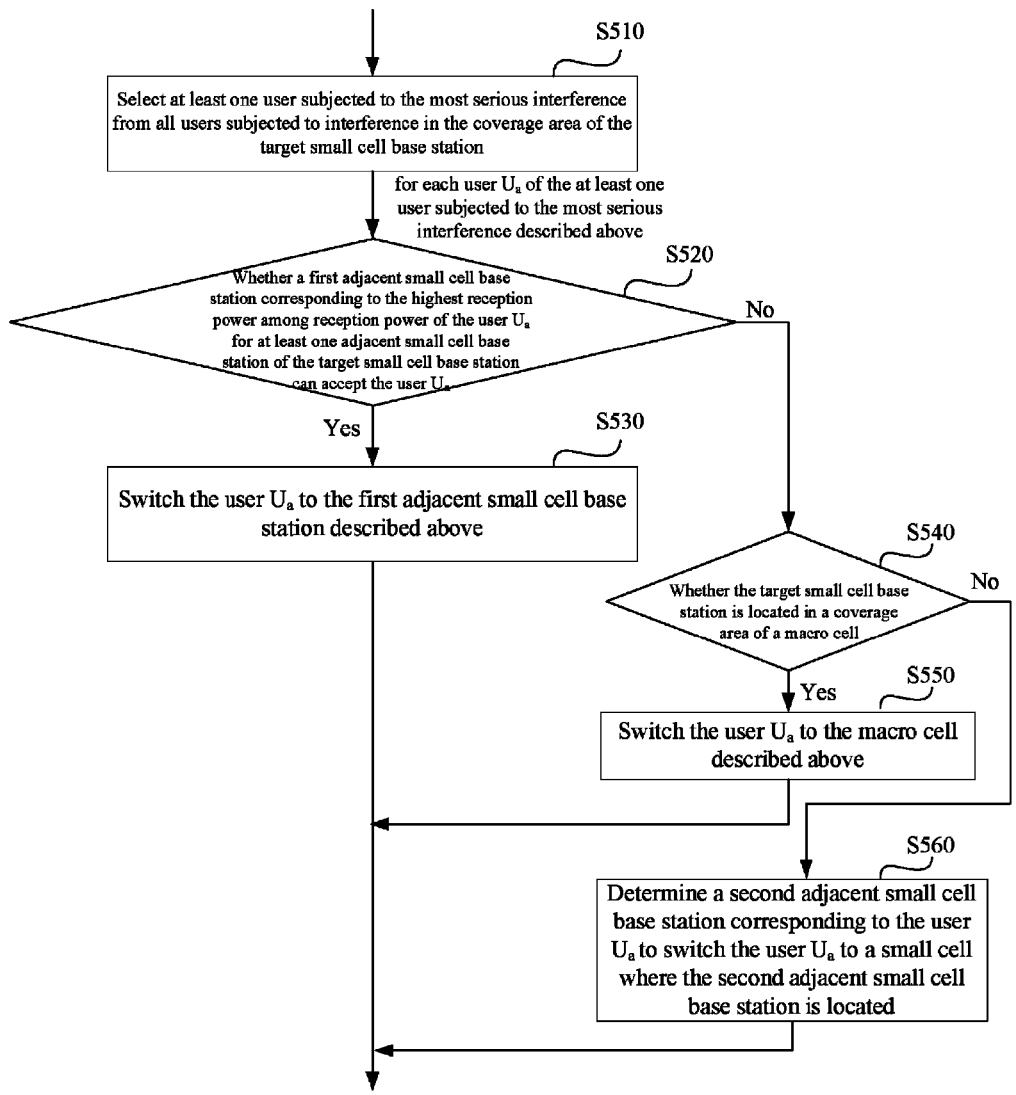

In another example (a seventh example), the further adjustment described above can also include steps S510 to S560 as shown in the FIG. 5C.

Specifically, processing of the steps S510 to S550 shown in FIG. 5C may be identical to those of the steps S510 to S550 described above in conjunction with FIG. 5B respectively, and can achieve the same effect, thus the processing of the steps S510 to S550 shown in FIG. 5C are not described in detail here further.

It should be illustrated that if it is determined that the target small cell base station is not located in the coverage area of the macro cell in the step S540 shown in FIG. 5C, a step S560 is then performed.

In the step S560, a second adjacent small cell base station corresponding to the highest reception power of the user is selected from one or more adjacent small cell base stations capable of accepting the user among the at least one adjacent small cell base station of the target small cell base station except the first adjacent small cell base station, to switch the user $U_a$ to the small cell where the second adjacent small cell base station is located. Then, a subsequent processing (for example the step S250) after the further adjustment is performed.

It should be illustrated that in other examples, the further adjustment described above may also include only the steps S510 to S540 and S560 shown in FIG. 5C, but may not include the step S550. In this case, if it is determined that the target small cell base station is located in the coverage area of the macro cell in the step S540, a subsequent processing (for example the step S250) after the further adjustment can be performed. Other processing in this case may be identical to the other processing in the seventh example, and will not be described here further.

Figure 5D:
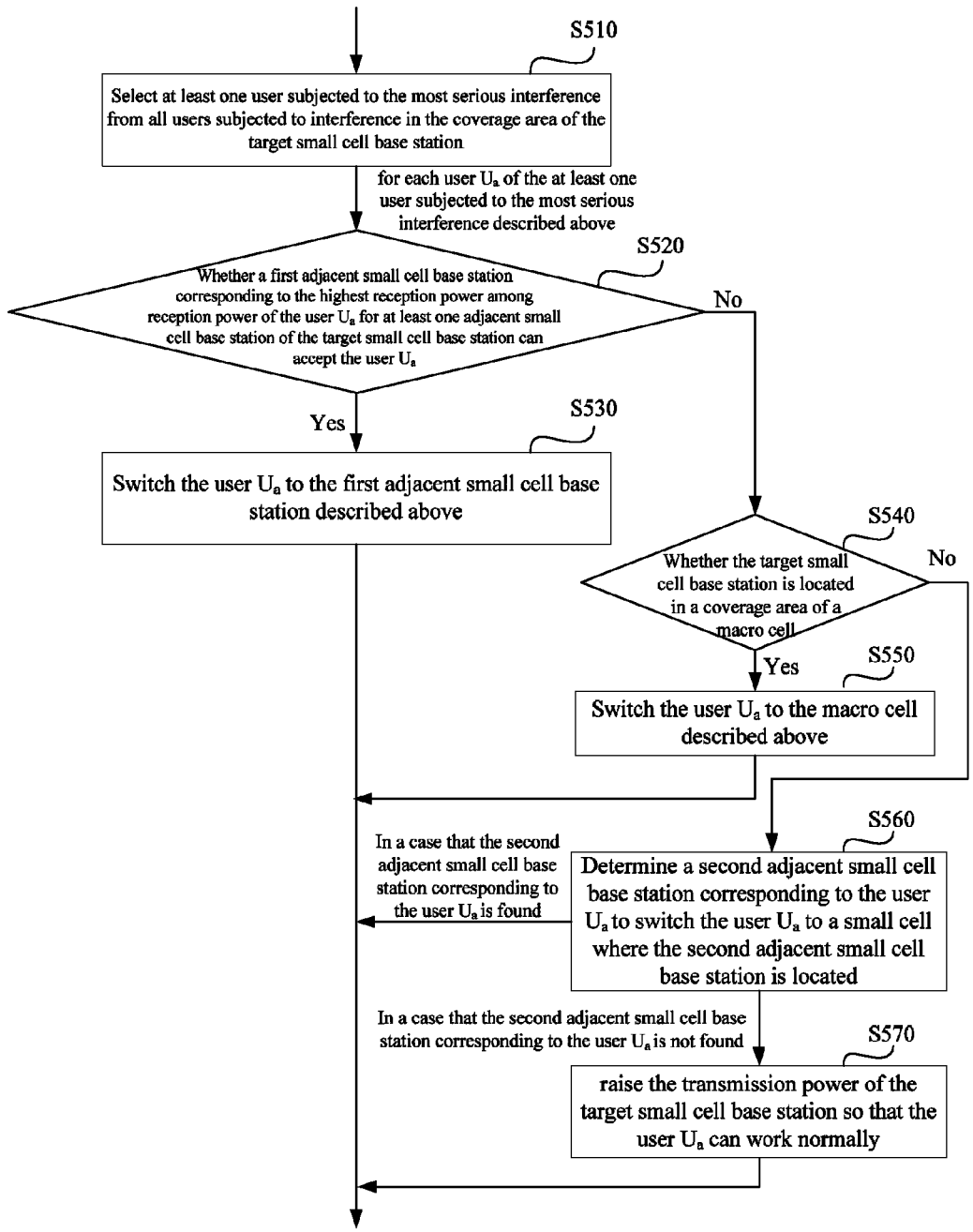

In addition, in another example (an eighth example), the further adjustment described above may also include steps S510 to S570 as shown in FIG. 5D.

Specifically, processing of the steps S510 to S560 shown in FIG. 5D can be identical to the processing of the steps S510 to S560 described above in conjunction with FIG. 5C respectively, and can achieve the same effect, thus the processing of the steps S510 to S560 shown in FIG. 5D are not described in detail here further.

It should be illustrated that if a second adjacent small cell base station conforming to the condition is not found in the step S560 shown in FIG. 5D, a step S570 is then performed.

In the step S570, the transmission power of the target small cell base station is raised so that the user $U_a$ can operate normally. Then, a subsequent processing (for example the step S250) after the further adjustment is performed.

Specifically, in the seventh example or the eighth example described above, the target small cell base station can be located for example in the small cell deployment scenario 3 in LTE-A.

Hence, each of the at least one user subjected to the most serious interference described above can be switched to other small cell or macro cell by employing the processing above described in conjunction with any one of the FIGS. 5A to 5C, therefore, the at least one user subjected to the most serious interference can be switched to a corresponding other small cell or a macro cell respectively.

In still another example (a ninth example), after the at least one user subjected to the most serious interference are all switched to the corresponding other small cell or the macro cell, the transmission power of the target small cell base station can be lowered in a corresponding predetermined manner.

In one example, the step of "the transmission power of the target small cell base station is lowered in a corresponding predetermined manner" can be realized by the following processing: according to a difference between the highest reception power and the lowest reception power of the at least one user subjected to the most serious interference described above for the target small cell base station, and according to a difference between the highest reception power of the at least one user subjected to the most serious interference described above for the target small cell base station and the lowest reception power of the other user or users except the at least one user subjected to the most serious interference of the target small cell base station for the target small cell base station, determining lowered transmission power of the target small cell base station; and according the determined lowered transmission power of the target small cell base station described above, lowering the transmission power of the target small cell base station.

For example, it is assumed that original transmission power of the target small cell base station is $P_{tp\text{-}0}$, the number of the at least one user subjected to the most serious interference is m, provided that a user with the highest reception power for the target small cell base station among the m users subjected to the most serious interference is the i-th user, the reception power of the i-th user for the target small cell base station is denoted by $P_{rp\text{-}i}$, and provided that a user with the lowest reception power for the target small cell base station among the m users subjected to the most serious interference is a j-th user, the reception power of the j-th user for the target small cell base station is denoted by $P_{rp\text{-}j}$. In addition, provided that a user with the lowest reception power for the target small cell base station among other users except the m users subjected to the most serious interference of the target small cell base station is a k-th user, the reception power of the k-th user for the target small cell base station is denoted by $P_{rp\text{-}k}$. Therefore, the adjusted transmission power of the target small cell base station can be calculated from an equation as follows:

$$P_{tp}=P_{tp\text{-}0}-(P_{rp\text{-}i}-P_{rp\text{-}j})-\alpha(P_{rp\text{-}k}-P_{rp\text{-}i})$$

where $P_{tp}$ is the adjusted transmission power of the target small cell base station, and α is an adjustment factor, which can be determined according a particular implementation situation (or may also according to an empirical value or via an experimental method).

In another example, the step of "the transmission power of the target small cell base station is lowered in a corresponding predetermined manner" described above can be realized by the following processing: gradually lowering the transmission power of the target small cell base station at a second predetermined step size, until all of the at least one user subjected to the most serious interference are not located in the coverage area of the target small cell base station; and switching users who leave the coverage area of the target small cell base station while the transmission power of the target small cell base station is lowered to an adjacent small cell or a macro cell.

Furthermore, after the further processing described in any one of the fifth example to the ninth example above is finished, optionally, in a case that a user in a Radio Resource Control (RRC) idle state requests for a connection after leaving an original service small cell thereof, cell reselection can be conducted for the user in the RRC idle state to have the user access to another small cell or a macro cell with enough receptivity.

In a particular implementation manner (a fourth implementation manner), when other small cell base station receives a request to adjust power (the request may come from for example the target small cell base station or may also come from the baseband cloud), if the number of edge users in the coverage area of the other small cell base station is below a second predetermined number, then transmission power of the other small cell base station can be lowered, and if the number of edge users in the coverage area of the other small cell base station is above or equal to the second predetermined number, then the other small cell base station described above can reject the request.

In one example of the particular fourth implementation, in a case that the request described above comes from the target small cell base station, and the other small cell base station described above rejects the request, the transmission power of the target small cell base station can be raised to have the users in the coverage area of the target small cell base station, subjected to the interference of the other small cell base station described above operate normally.

An exemplary processing of the second kind of preliminary adjustment performed in the step S240 will be described below in conjunction with the FIG. 6. In the exemplary processing, in a case that a coverage area of the requested small cell base station includes a central region and an edge region, when the requested small cell base station receives a request to adjust power for example from the target small cell base station or the baseband cloud, the second kind of preliminary adjustment performed in the step S240 can be realized by steps S610 to S620 shown in FIG. 6.

Figure 6:
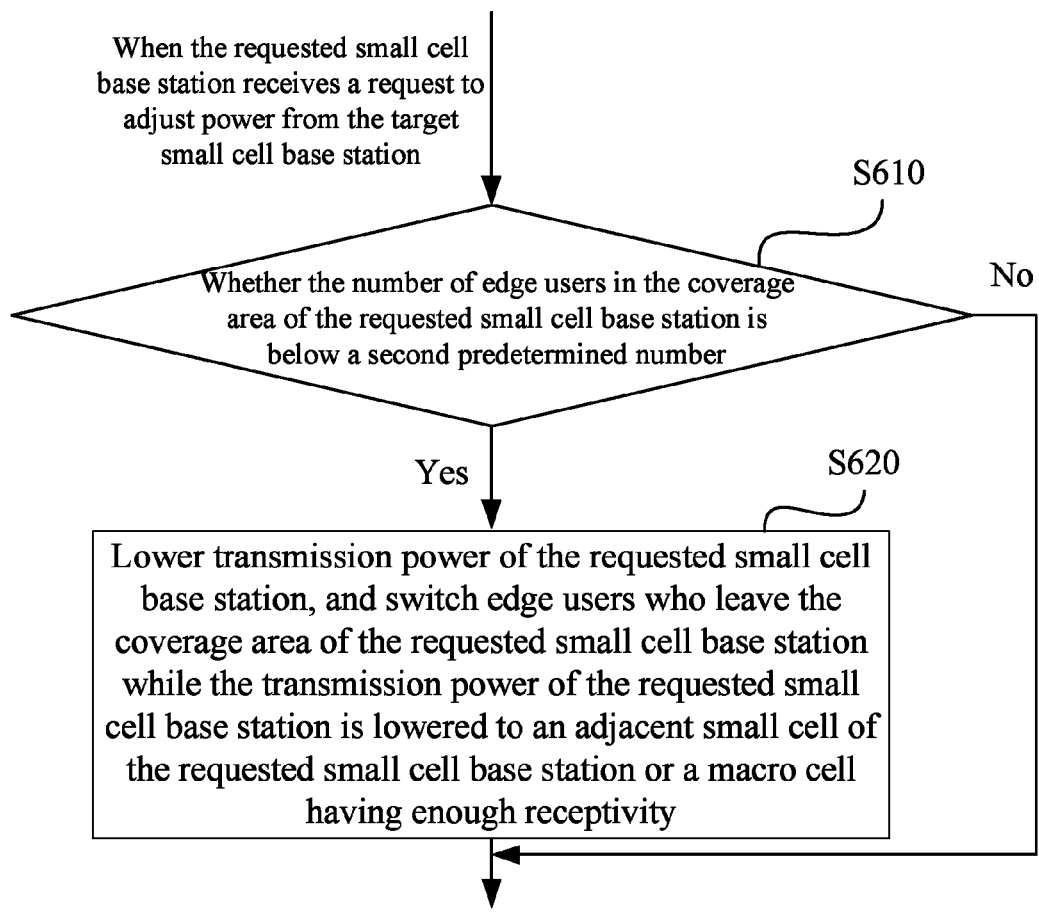
FIG. 6 is a flow chart for schematically showing one possible exemplary processing of a step S240 as shown in FIG. 2.

As shown in FIG. 6, when the requested small cell base station receives a request to adjust power from the target small cell base station, a step S610 is performed.

In the step S610, it is determined whether the number of edge users in the coverage area of the requested small cell base station is below a second predetermined number: if the number of edge users in the coverage area of the requested small cell base station is below the second predetermined number, a step S620 is performed; otherwise, a subsequent processing (for example the step S250) after the step S620 is performed.

In the step S620, the transmission power of the requested small cell base station is lowered, and edge users who leave the coverage area of the requested small cell base station while the transmission power of the requested small cell base station is lowered can be switched to an adjacent small cell of the requested small cell base station or a macro cell having enough receptivity.

In one example (a tenth example), processing of the step S620 can be realized by the following processing: lowering transmission power of the requested small cell base station at a first predetermined step size, and switching edge users who leave the coverage area of the requested small cell base station while the transmission power of the requested small cell base station is lowered to an adjacent small cell of the requested small cell base station or a macro cell, until the adjacent small cell of the requested small cell base station or the macro cell does not have enough resources to accept the edge users described above who leave the coverage area of the requested small cell base station.

Figure 7:
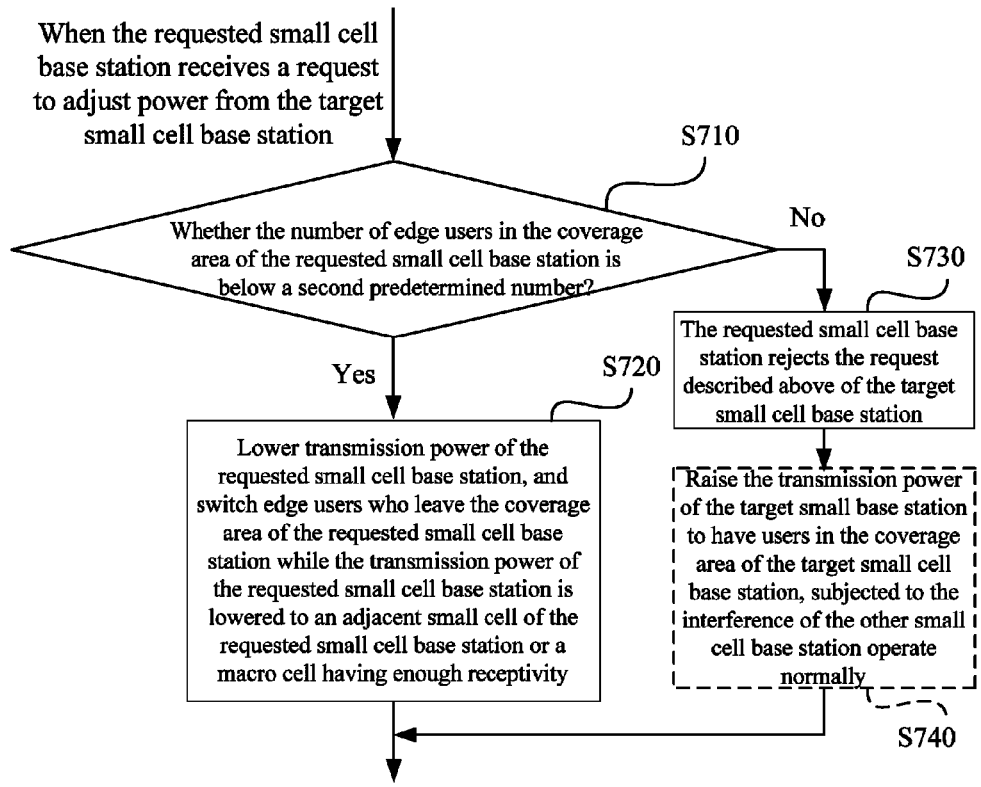
FIG. 7 is a flow chart for schematically showing other possible exemplary processing of a step S240 as shown in FIG. 2.

In another example (an eleventh example), the step S240 may also include steps S710 to S730 shown in FIG. 7.

In step S710, it is determined whether the number of the edge users in the coverage area of the requested small cell base station is below the second predetermined number; if the number of the edge users in the coverage area of the requested small cell base station is below the second predetermined number, a step S720 is then performed; otherwise, a step S730 is performed.

Specifically, processing of the steps S710 and S720 are identical to the processing of the steps S610 and S620 described above in conjunction with FIG. 6 respectively, and the same effect can be achieved, thus processing of the steps S710 and S720 are not described in detail here further. It should be illustrated that after the step S720 is performed, a subsequent processing (for example the step S250) after the step S730 is performed.

In a step S730, the requested small cell base station rejects the request of the target small cell base station described above. Then, a subsequent processing (for example the step S250) after the step S730 is performed.

Furthermore, in another example (a twelfth example), the step S240 can also selectively include a step S740 as shown in FIG. 7 besides including the steps S710 to S730 as shown in FIG. 7. Specifically, the step S740 is performed after the step S730.

In the step S740, the requested small cell base station has rejected the request of the target small cell base station described above, in this case, the transmission power of the target small cell base station can be raised to have users in the coverage area of the target small cell base station, subjected to the interference of the other small cell base station operate normally. After the step S740 is performed, a subsequent processing (for example the step S250) can be performed, for example.

In addition, in yet another example (a thirteenth example), the step S240 can also selectively include a step S750 as shown in FIG. 7 besides including the steps S710 to S740 as shown in FIG. 7. Specifically, the step S750 is performed after the step S730.

In the step S750, the requested small cell base station can reply to the target small cell base station, to notify the target small cell base station of a result that the requested small cell base station accepts or rejects the request from the target small cell base station. After the step S750 is performed, a subsequent processing (for example the step S250) can be performed, for example.

In one implementation manner of the interference coordination method according to the embodiment of the present invention, after the processing of the step S230 or the step S240 described above, if transmission power of the small cell base station (for example, the target small cell base station or any one small cell base station except the target small cell base station) is the lowest transmission power thereof or covers only the central region thereof, in a case that the number of users initiating service requests in the original coverage area of the small cell base station for a past first predetermined time period exceeds a third predetermined number, or in a case that other small cell cannot satisfy service requests of extra users, the small cell base station can raise transmission power thereof at a third predetermined step size, until all the users initiating the service requests are accessed to the small cell base station, or until a new user can not access over remaining resources of the small cell base station. Specifically, the first predetermined time period is for example a certain time range of day, such as 9:00 a.m to 10:00 a.m of day, 3:00 p.m to 5:00 p.m of day, or the like.

In one example, if the transmission power of the target small cell base station (as an example of the small cell base station described above) is the lowest transmission power thereof or covers only the central region thereof, and it is known from the historical statistical information that the number of users initiating service requests in the coverage area of the target small cell base station within a time period from 9:00 a.m to 10:00 a.m of day is above the third predetermined number (for example 50), the target small cell base station can raise the transmission power thereof at the third predetermined step size, until all the users initiating the service requests are accessed to the target small cell base station.

In another example, if the transmission power of the target small cell base station (as an example of the small cell base station described above) is the lowest transmission power thereof or covers only the central region thereof, when an adjacent small cell of the target small cell base station cannot satisfy service requests of extra users and thus sends a request to accept the extra users to the target small cell base station, the target small cell base station can raise the transmission power thereof at the third predetermined step size to have the target small cell base station accept the extra users described above, until a new user can not access over remaining resources of the target small cell base station.

In addition, in one implementation manner of the interference coordination method according to the embodiment of the present invention, after the step S240 described above is performed, in a case that the requested small cell base station described above accepts the request from the target small cell base station, and thus adjusts power, if the requested small cell base station does not receive a request to adjust power from any other small cell base station (including the target small cell base station) within a second predetermined time period thereafter, the requested small cell base station can raise transmission power thereof, for example, at a fifth predetermined step size.

Furthermore, in one implementation manner of the interference coordination method according to the embodiment of the present invention, for any one small cell base station in the target small cell base station described above and other respective small cell base stations included in the wireless communication system, if the number of users of the small cell base station is below a fourth predetermined number, then transmission power of the small cell base station is lowered at a fourth predetermined step size so that the lowered transmission power of the small cell base station can ensure the connection of users thereof.

In another implementation manner of the interference coordination method according to the embodiment of the present invention, in a LTE-TDD system (as an example of the wireless communication system), when the target small cell subjects to interference from one or more small cell base stations in other clusters of small cells, the target small cell base station can transmit requests to adjust power to the one or more small cell base stations in the other clusters of small cells described above producing the interference to the target small cell, that is, requests the one or more small cell base stations in the other clusters of small cells described above to adjust power to lower the interference to the target small cell. Specifically, the requests to adjust power transmitted to the one or more small cell base stations in the other clusters of small cells described above can include for example a name or an identity (ID) of the small cell base station to be power adjusted and an indicator of power adjustment thereof to be performed. Wherein, the indicator of power adjustment can for example include at least one of lowering power and lowering interference timeslots. Hence, the one or more small cell base stations in the other clusters of small cells can adjust the transmission power thereof according to the request of power adjustment described above transmitted from the target small cell base station.

In one example, in the LTE-TDD system (as an example of the wireless communication system) described above, for each cluster of small cells in the other clusters of small cells, interference of one or more small cell base stations in another cluster of small cells (for example, any one cluster of small cells in the other clusters of small cells described above) to the target small cell can be interference from all timeslots of the multiple small cell base stations in the another cluster of small cells described above, can be interference from a certain timeslot of the multiple small cell base stations in the cluster of small cells described above, and can also be interference from all timeslots of one small cell base station in the another cluster of small cells described above, or can be interference from one timeslot of one small cell base station in the another cluster of small cells described above.

In another example, in the LTE-TDD system (as an example of the wireless communication system) described above, in a case that the target small cell base station subjects to interference from one or more small cell base stations in other clusters of small cells, the one or more small cell base stations in the other clusters of small cells described above producing the interference to the target small cell base station can lower power thereof on the timeslots where the interference to the target small cell base station is produced (for example, lower to a preset power value, in which, the preset power value can be determined from an empirical value or via an experimental method), to lower the interference to the target small cell base station produced by itself.

In one implementation manner of the interference coordination method according to the embodiment of the present invention, in a case that the target small cell base station is located in a coverage area of a macro cell in the wireless communication system (for example, the target small cell base station is located in the small cell deployment scenario 2a or 2b in LTE-A), if the ping-pang handover between at least two of the target small cell base station and other respective small cell base stations occurs to a user, the user occurring the ping-pang handover can be switched to the macro cell.

It should be illustrated that the first predetermined threshold to the third predetermined threshold, the first predetermined number to the fourth predetermined number, the first predetermined step size to the fifth predetermined step size and the first predetermined time period and the second predetermined time period described above are acquired from empirical values respectively, or can be determined by experimental methods, which are not described here anymore.

In addition, it should be illustrated that in one implementation manner of the interference coordination method according to the embodiment of the present invention, if interference to the target small cell satisfies the predetermined condition, any one of the step S230 and the step S240 can be performed, or one of the step S230 and the step S240 can be performed first, and when a processing result obtained from the step performed first cannot make the interference to the target small cell lower to a predetermined degree, the other step of the step S230 and the step S240 can then be performed. Furthermore, in other implementation manners, when the interference to the target small cell satisfies the predetermined condition, the step S230 and the step S240 can also be performed simultaneously, for example, a power amplitude of the target small cell base station to be adjusted in the step S230 and a power amplitude of the requested small cell base station to be adjusted in the step S240 can be allocated according to a certain proportion.

The processing flow 200 ends at the step S250.

It can be known from the above description that the interference coordination method described above according to the embodiment of the present invention can lower the interference to the target small cell by, in a case that the interference to the target small cell base station satisfies a predetermined condition, indicating the target small cell base station to adjust power according the number of users, or indicating the target small cell base station to request other base station or stations to adjust power according to the number of users. Furthermore, the interference coordination method according to the embodiment of the present invention described above can save energy by power adjustment. In addition, in some embodiments, the interference coordination method according to the embodiment of the present invention adjusts a coverage area of the small cell by dynamically controlling downlink power to significantly lower interference between cells. Therefore, network performance can be enhanced well while ensuring user service quality.

The embodiment of the present invention also provides an interference coordination device in the wireless communication system, the interference coordination device includes: a determination unit configured to determine whether interference to a target small cell satisfies a predetermined condition; and a control unit configured to, in a case that the interference to the target small cell satisfies the predetermined condition, to control the target small cell base station to adjust power at least based upon the number of users in a coverage area thereof, and/or to control the target small cell base station to request other small cell base station or stations producing the interference thereto to adjust power at least based upon the number of users in a coverage area of the other small cell base station or stations producing the interference described above to lower the interference to the target small cell.

In one implementation manner of the interference coordination device in the wireless communication system according to the embodiment of the present invention, each base station (for example, each of small cell base stations and macro base stations) can be provided with a corresponding interference coordination device. Furthermore, in another implementation manner, the interference coordination device described above can also be provided at the baseband cloud, so that each base station (for example, each of small cell base stations and macro base stations) can determine whether the subjected interference thereto satisfies the predetermined condition, if the subjected interference thereto satisfies the predetermined condition, the base station reports information such as the interference and the number of users (or directly communicates all interference situation, and the baseband cloud then determine whether the interference satisfies the predetermined condition) to the interference coordination device, then the baseband cloud determines power adjustment (for example, indicating a base station subjected to the interference to adjust power itself or indicating a base station serving as the interference source to adjust power correspondingly).

Furthermore, in one implementation manner of the interference coordination device in the wireless communication system according to the embodiment of the present invention, the interference coordination device can be provided for example at a small cell base station side or a macro base station side.

Figure 8:
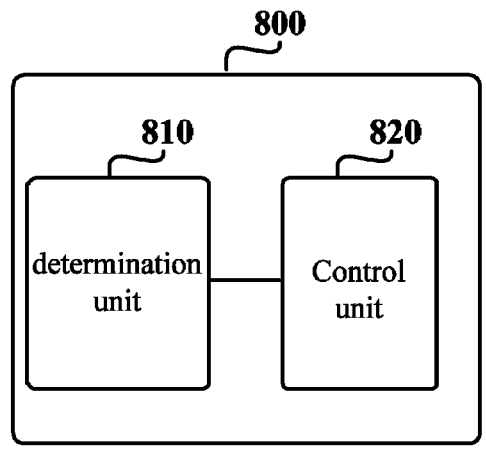
FIG. 8 is a block diagram for schematically showing one exemplary structure of an interference coordination device in a wireless communication system according to an embodiment of the present invention.

FIG. 8 is an exemplary structure for schematically illustrating an interference coordination device in the wireless communication system according to the embodiment of the present invention. As shown in FIG. 8, the interference coordination device 800 includes a determination unit 810 and a control unit 820.

The determination unit 810 is configured to determine whether interference to a target small cell satisfies a predetermined condition. Specifically, the processing performed by the determination unit 810 can be similar to for example the processing of the step S220 in the interference coordination method described above in conjunction with FIG. 2 to FIG. 7, and can achieve the same effect, thus the processing performed by the determination unit 810 is not described here further.

Furthermore, the control unit 820 is configured, in a case that the interference to the target small cell satisfies the predetermined condition, to perform the processing of the step S230 in the interference coordination method described above in conjunction with FIG. 2 to FIG. 7, or to perform the processing of the step S240 in the interference coordination method described above in conjunction with FIG. 2 to FIG. 7, and can achieve the same effect, which are not described here further.

It can be known from the above description that the interference coordination device according to the embodiment of the present invention can lower the interference to the target small cell base station by, in the case that the interference to the target small cell satisfies the predetermined condition, indicating the target small cell base station to adjust power according to the number of users, or indicating the target small cell base station to request other base station or stations to adjust power according the number of users. Furthermore, the interference coordination device according to the embodiment of the present invention described above can save energy by power adjustment. In addition, in some embodiments, the interference coordination device according to the embodiment of the present invention described above adjusts the coverage area of the small cell by dynamically controlling downlink power to significantly lower the interference between cells. Therefore, network performance can be enhanced well while ensuring user service quality.

It should be illustrated that component units in the interference coordination device in the wireless communication system according to the embodiment of the present invention described above can perform processing similar to the processing of a corresponding step or a corresponding sub-step in the interference coordination method in the wireless communication system above described in conjunction with the FIG. 2 to FIG. 7, achieving the similar function or effect, which is not described here further.

Furthermore, it should also be illustrated that the interference coordination method, the interference coordination device and the measurement device according the embodiment of the present invention can be applied to the small cell deployment scenarios 2a, 2b and 3 in LET-A described above, but an application scenario of the interference coordination method, the interference coordination device and the measurement device described above is not limited thereto, and the interference coordination method, the interference coordination device and the measurement device described above can be applied to other similar scenario by those skilled in the art in conjunction with the above description.

Furthermore, the embodiment of the present invention also provides a measurement device in the wireless communication system, the measurement device includes: a measurement unit configured to obtain interference to each user in a coverage area of each small cell base station in the wireless communication system and to transmit the interference to each user to a service base station of the user, in which, the service base station of the user is provided with the interference coordination device described above.

In the above description for each embodiment of the present invention, features described and/or shown for one embodiment (implementation manner, example and so on) can be used in one or more other embodiments, combined with features in other embodiments, or substitute features in the other embodiments, in the same or similar manner.

Furthermore, the method in each embodiment of the present invention is not limited to be performed according to a time sequence described in the specification or shown in the accompanying drawings, and can be performed in parallel or separately or according to other time sequences. Therefore, the sequence for performing the method described in this specification does not limit the technical scope of the present invention.

The embodiments disclosed in the specification may also be configured according to the embodiments outlined below.

According to an exemplary embodiment there is provided a system including circuitry configured to determine to modify transmission power of a first small cell; determine an effect of modifying the transmission power of the first small cell on a user equipment that is served by the first small cell; and control modifying the transmission power of the first small cell based on the determination to modify the transmission power and the determined effect of modifying the transmission power on the user equipment that is served by the first small cell.

According to the above system, the first small cell is provided in a same area as a macro cell, the first small cell having a smaller coverage area than the macro cell.

According to the above system, the circuitry is configured to determine to modify transmission power of the first small cell when it is determined that interference in the first small cell or a second small cell located adjacent to the first small cell exceeds a predetermined threshold value.

According to the above system, the circuitry is configured to control the first small cell to reduce transmission power when it is determined that the interference in the first small cell or a second small cell located adjacent to the first small cell exceeds a predetermined threshold value.

According to the above system, the circuitry is configured to control increasing the transmission power when a predetermined condition is satisfied, the predetermined condition including at least one of the interference in the first small cell or a second small cell located adjacent to the first small cell reducing below the predetermined threshold value; a number of user equipment requesting access to the first small cell exceeds a predetermined threshold value; and stored scheduling information indicates that the transmission power of the first small cell should be increased at a predetermined time and/or date.

According to the above system, a coverage area of the first small cell includes a central region including user equipment having a first level of interference and an edge region including user equipment having a second level of interference that is greater than the first level of interference.

According to the above system, the circuitry is configured to determine the effect of modifying the transmission power of the first small cell based on a number of user equipment in the central region and a number of user equipment in the edge region.

According to the above system, the circuitry is configured to not reduce the transmission power of the first small cell when the number of user equipment in the edge region exceeds a predetermined threshold value.

According to the above system, the circuitry is configured to reduce the transmission power of the first small cell until it is determined that user equipment no longer capable of accessing the first small cell are not able to be handed over to another cell.

According to the above system, the circuitry is configured to determine whether the number of user equipment in the central region of the coverage area of the first small cell is less than a predetermined threshold value.

According to the above system, the circuitry is configured to reduce transmission power of the first small cell to service only user equipment located in the central region of the cell when the number of user equipment in the central region of the coverage area of the first small cell is greater than the predetermined threshold value.

According to the above system, the circuitry is configured to reduce transmission power of the first small cell such that the first small cell is not able to transmit a downlink signal to a user equipment, but is capable of communicating with another base station when the number of user equipment in the central region of the coverage area of the first small cell is less than the predetermined threshold value.

According to the above system, the circuitry is configured to determine a ratio of the number of user equipment in the central region and the number of user equipment in the edge region.

According to the above system, the circuitry is configured to reduce transmission power of the first small cell to service only user equipment located in the central region of the cell when the ratio of the number of user equipment in the central region of the coverage area of the first small cell is greater than a predetermined threshold value.

According to the above system, the circuitry is configured to identify a first user equipment served by the first small cell that is subject to a highest level of interference among a plurality of user equipment served by the first small cell.

According to the above system, the circuitry is configured to determine whether the first user equipment is capable of being handed over to a macro cell serving the same area of the first small cell or second small cell adjacent to the first small cell.

According to the above system, the circuitry is configured to instruct the first user equipment to handover to the macro cell or the second small cell and control reduction of the transmission power of the first small cell based on the handover of the first user equipment.

According to the above system, the circuitry is configured to: determine that reducing the transmission power of the first small cell would cause a user equipment that is not capable of being handed over to another cell to no longer be capable of accessing the first small cell or cause a number of user equipment above a threshold value to no longer be capable of accessing the first small cell; and control reducing transmission power of a second small cell causing interference to the first small cell or control increasing transmission power of the first small cell when it is determined that reducing the transmission power of the first small cell would cause the user equipment that is not capable of being handed over to another cell to no longer be capable of accessing the first small cell or cause a number of user equipment above a threshold value to no longer be capable of accessing the first small cell.

According to another exemplary embodiment there is provided a non-transitory computer-readable medium including computer-readable instructions, which when executed by a system, cause the system to: determine to modify transmission power of a first small cell; determine an effect of modifying the transmission power of the first small cell on a user equipment that is served by the first small cell; and control modifying the transmission power of the first small cell based on the determination to modify the transmission power and the determined effect of modifying the transmission power on the user equipment that is served by the first small cell.

According to another exemplary embodiment there is provided a method performed by a system, the method comprising: determining, by circuitry of the system, to modify transmission power of a first small cell; determining, by circuitry of the system, an effect of modifying the transmission power of the first small cell on a user equipment that is served by the first small cell; and controlling, by circuitry of the system, modifying the transmission power of the first small cell based on the determination to modify the transmission power and the determined effect of modifying the transmission power on the user equipment that is served by the first small cell.

According to another exemplary embodiment there is provided an interference coordination method in a wireless communication system, comprising: in a case that interference to a target small cell satisfies a predetermined condition, the target small cell base station adjusting power at least based upon the number of users in a coverage area thereof, and/or requesting other small cell base station or stations producing interference thereto to adjust power at least based upon the number of users in a coverage area of the other small cell base station or stations producing the interference to lower the interference to the target small cell.

According to the above method, the predetermined condition comprises: that the interference to the target small cell is above a first predetermined threshold; and/or that the target small cell is any of at least one small cell subjected to the most serious interference in the wireless communication system or in a predetermined cluster of small cells.

According to the above method, the interference to the target small cell is estimated according to transmission power of respective small cell base stations in the wireless communication system; or the interference to the target small cell corresponds to interference to the users in the coverage area of the target small cell base station.

According to the above method, a small cell base station adjusting power comprises lowering transmission power of the small cell base station to narrow the coverage area of the small cell base station, and switching users who leave the coverage area of the small cell base station while the transmission power of the small cell base station is lowered to other cell or cells.

According to the above method, for each small cell base station of the target small cell base station and other respective small cell base stations comprised in the wireless communication system, a coverage area of the small cell base station comprises a central region and an edge region, wherein the central region is a region where central users with a signal quality satisfying a predetermined quality condition are located, and the edge region is a region where edge users with a signal quality dissatisfying the predetermined quality condition are located; and the respective small cell base stations adjust power at least based upon the number of the central users and/or the edge users thereof.

According to the above method, the predetermined quality condition corresponds to that an RSRP/RSRQ value is above or equal to a second predetermined threshold.

According to the above method, the other cell or cells comprise an adjacent small cell of the small cell base station and a macro cell covering the small cell, and wherein the adjacent small cell has a higher priority level than that of the macro cell.

According to the above method, the lowering transmission power of the small cell base station comprises: lowering the transmission power of the small cell base station at a first predetermined step size, and switching edge users who leave the coverage area of the small cell base station while the transmission power of the small cell base station is lowered to other cell or cells until the edge users who leave the coverage area of the small cell base station cannot be switched to the other cell or cells.

According to the above method, in a case that the users who leave the coverage area of the small cell base station while the transmission power of the small cell base station is lowered can be switched to the other cell or cells, transmission power of the small cell base station is at least lowered to be only capable of covering the central region thereof.

According to the above method, in a case that the number of central users in the coverage area of the small cell base station is below a first predetermined number, transmission power of the small cell base station is adjusted to the lowest transmission power thereof, and wherein the lowest transmission power of the small cell base station is transmission power at which the small cell base station cannot transmit a downlink signal to a user thereof but can communication with another base station.

According to the above method, when other small cell base station receives a request to adjust power, if the number of edge users in the coverage area of the other small cell base station is below a second predetermined number, then transmission power of the other small cell base station is lowered, and if the number of edge users in the coverage area of the other small cell base station is above or equal to the second predetermined number, then the other small cell base station rejects the request.

According to the above method, in a case that the other small cell base station rejects the request, transmission power of the target small cell base station is raised to have users, in the coverage area of the target small cell base station, subjected to the interference of the other small cell base station operate normally.

According to the above method, for each of at least one user subjected to the most serious interference in the coverage area of the target small cell base station, in a case that a first adjacent small cell base station corresponding to the highest reception power among reception power of the users for at least one adjacent small cell base station of the target small cell base station can accept the user, switching the user to the first adjacent small cell base station, and in a case that the first adjacent small cell base station cannot accept the user, if the target small cell base station is in a coverage area of a macro cell, then switching the user to the macro cell.

According to the above method, in a case that a user in a RRC idle state requests for a connection after leaving an original service small cell thereof, cell reselection is conducted for the user in the RRC idle state to have the user access to another small cell or a macro cell.

According to the above method, in a case that transmission power of a small cell base station is the lowest transmission power thereof or covers only the central region thereof, when the number of users initiating service requests in the original coverage area of the small cell base station for a past first predetermined time period exceeds a third predetermined number, or when other cell cannot satisfy service requests of extra users, the small cell base station raising transmission power thereof at a third predetermined step size until all the users initiating the service requests are accessed, or until a new user cannot access over remaining resources of the small cell base station.

According to the above method, for any of the target small cell base station and other respective small cell base stations comprised in the wireless communication system, if the number of users of the small cell base station is below a fourth predetermined number, then lowering transmission power of the small cell base station at a fourth predetermined step size so that lowered transmission power of the small cell base station can ensure a connection of users thereof.

According to the above method, the request to adjust power comprises: a name or an ID of the small cell base station to be power adjusted and an indicator of power adjustment thereof to be performed, wherein the indicator of power adjustment comprises at least one of lowering power and lowering interference timeslots.

According to another exemplary embodiment there is provided an interference coordination device in a wireless communication system, comprising: a determination unit configured to determine whether interference to a target small cell satisfies a predetermined condition; and a control unit configured, in a case that the interference to the target small cell satisfies the predetermined condition, to control the target small cell base station to adjust power at least based upon the number of users in a coverage area thereof, and/or to control the target small cell base station to request other small cell base station or stations producing interference thereto to adjust power at least based upon the number of users in a coverage area of the other small cell base station or stations producing the interference to lower the interference to the target small cell.

According to the above device, the interference coordination device is arranged at a small cell base station side or a macro base station side.

According to another exemplary embodiment there is provided a measurement device in a wireless communication system, comprising: a measurement unit configured to obtain interference to each user in a coverage area of each small cell base station in the wireless communication system and to send the interference to each user to a service base station of the user, wherein the service base station of the user is provided with the interference coordination device above.

It should also be illustrated that a relational term such as left and right, a first or a second herein is only used to distinguish one entity or operation from another entity or operation, and does not necessarily require or imply that there is an actual relationship or sequence between these entities or operations. Also, terms "comprise", "include" or any other variants are intended to cover non-exclusive "include", so that a procedure, a method, an object or an equipment including a series of elements not only include the series of elements, but also include other elements not explicitly listed, or also include elements inherent to the procedure, the method, the object or the equipment. Without more limitation, an element defined in a sentence "include one . . . " does not exclude the existence of another same element in the procedure, the method, the object or the equipment including said element.

The invention claimed is:
1. A system comprising:
circuitry configured to
   determine to modify transmission power of a first small cell base station;
   determine an effect of modifying the transmission power of the first small cell base station on a user equipment that is served by the first small cell base station; and
   control modifying the transmission power of the first small cell base station based on the determination to modify the transmission power and the determined effect of modifying the transmission power on the user equipment that is served by the first small cell base station;
   wherein the circuitry is further configured to control the first small cell base station to reduce transmission power when it is determined that an interference in the first small cell base station or a second small cell base station located adjacent to the first small cell base station exceeds a predetermined threshold value.
2. The system of claim 1, wherein
the first small cell base station is provided in a same area as a macro cell base station, the first small cell base station having a smaller coverage area than the macro cell base station.
3. The system of claim 1, wherein
the circuitry is configured to control increasing the transmission power when a predetermined condition is satisfied, the predetermined condition including at least one of
   the interference in the first small cell base station or the second small cell base station located adjacent to the first small cell base station reducing below the predetermined threshold value;
   a number of user equipment requesting access to the first small cell base station exceeds the predetermined threshold value; and
   stored scheduling information indicates that the transmission power of the first small cell base station should be increased at a predetermined time and/or date.
4. The system of claim 1, wherein
a coverage area of the first small cell base station includes a central region including user equipment having a first level of interference and an edge region including user equipment having a second level of interference that is greater than the first level of interference.
5. The system of claim 4, wherein
the circuitry is configured to determine the effect of modifying the transmission power of the first small cell base station based on a number of user equipment in the central region and a number of user equipment in the edge region.
6. The system of claim 5, wherein
the circuitry is configured to not reduce the transmission power of the first small cell base station when the number of user equipment in the edge region exceeds the predetermined threshold value.
7. The system of claim 1, wherein
the circuitry is configured to reduce the transmission power of the first small cell base station until it is determined that user equipment no longer capable of accessing the first small cell base station are not able to be handed over to another cell base station.
8. The system of claim 4, wherein
the circuitry is configured to determine whether a number of user equipment in the central region of the coverage area of the first small cell base station is less than the predetermined threshold value.
9. The system of claim 8, wherein
the circuitry is configured to reduce transmission power of the first small cell base station to service only user equipment located in the central region of the cell base station when the number of user equipment in the central region of the coverage area of the first small cell base station is greater than the predetermined threshold value.
10. The system of claim 8, wherein
the circuitry is configured to reduce transmission power of the first small cell base station such that the first small cell base station is not able to transmit a downlink signal to a user equipment, but is capable of communicating with another base station when the number of user equipment in the central region of the coverage area of the first small cell base station is less than the predetermined threshold value.
11. The system of claim 4, wherein
the circuitry is configured to determine a ratio of a number of user equipment in the central region and a number of user equipment in the edge region.
12. The system of claim 11, wherein
the circuitry is configured to reduce transmission power of the first small cell base station to service only user equipment located in the central region of the first small cell base station when the ratio is greater than the predetermined threshold value.
13. The system of claim 1, wherein
the circuitry is configured to identify a first user equipment served by the first small cell base station that is subject to a highest level of interference among a plurality of user equipment served by the first small cell base station.
14. The system of claim 13, wherein
the circuitry is configured to determine whether the first user equipment is capable of being handed over to a macro cell base station serving the same area of the first small cell base station or the second small cell base station adjacent to the first small cell base station.
15. The system of claim 14, wherein
the circuitry is configured to instruct the first user equipment to handover to the macro cell base station or the second small cell base station and control reduction of the transmission power of the first small cell base station based on the handover of the first user equipment.
16. The system of claim 1, wherein the circuitry is configured to:
   determine that reducing the transmission power of the first small cell base station would cause a user equipment that is not capable of being handed over to another cell base station to no longer be capable of accessing the first small cell base station or cause a number of user equipment above a threshold value to no longer be capable of accessing the first small cell base station; and
   control reducing transmission power of a second small cell base station causing interference to the first small cell base station or control increasing transmission power of the first small cell base station when it is determined that reducing the transmission power of the first small cell base station would cause the user equipment that is not capable of being handed over to another cell base station to no longer be capable of accessing the first small cell base station or cause a number of user equipment above a threshold value to no longer be capable of accessing the first small cell base station.

17. A non-transitory computer-readable medium including computer-readable instructions, which when executed by a system, cause the system to:
   determine to modify transmission power of a first small cell base station;
   determine an effect of modifying the transmission power of the first small cell base station on a user equipment that is served by the first small cell base station; and
   control modifying the transmission power of the first small cell base station based on the determination to modify the transmission power and the determined effect of modifying the transmission power on the user equipment that is served by the first small cell base station;
   wherein the system is further configured to control the first small cell base station to reduce transmission power when it is determined that an interference in the first small cell base station or a second small cell base station located adjacent to the first small cell base station exceeds a predetermined threshold value.

18. A method performed by a system, the method comprising:
   determining, by circuitry of the system, to modify transmission power of a first small cell base station;
   determining, by the circuitry of the system, an effect of modifying the transmission power of the first small cell base station on a riser equipment that is served by the first small cell base station; and
   controlling, by the circuitry of the system, modifying the transmission power of the first small cell base station based on the determination to modify the transmission power and the determined effect of modifying the transmission power on the user equipment that is served by the first small cell base station;
   wherein the first small cell base station is further controlled, by circuitry, to reduce transmission power when it is determined that an interference in the first small cell base station or a second small cell base station located adjacent to the first small cell base station exceeds a predetermined threshold value.

* * * * *